US009527934B2

(12) United States Patent
Buryak et al.

(10) Patent No.: US 9,527,934 B2
(45) Date of Patent: Dec. 27, 2016

(54) POLYETHYLENE COMPOSITION FOR PIPE AND PIPE COATING APPLICATIONS

(71) Applicant: BOREALIS AG, Vienna (AT)

(72) Inventors: Andrey Buryak, Linz (AT); Kurt Stubenrauch, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 14/896,843

(22) PCT Filed: Sep. 24, 2014

(86) PCT No.: PCT/EP2014/002590
§ 371 (c)(1),
(2) Date: Dec. 8, 2015

(87) PCT Pub. No.: WO2015/051881
PCT Pub. Date: Apr. 16, 2015

(65) Prior Publication Data
US 2016/0122448 A1 May 5, 2016

(30) Foreign Application Priority Data

Oct. 10, 2013 (EP) ..................... 13004875

(51) Int. Cl.
C08F 2/00 (2006.01)
C08F 4/00 (2006.01)
C08F 210/00 (2006.01)
C08F 10/02 (2006.01)
C09D 123/06 (2006.01)
C09D 123/08 (2006.01)
C08L 23/06 (2006.01)
C08L 23/08 (2006.01)
C08F 110/02 (2006.01)

(52) U.S. Cl.
CPC ............... C08F 10/02 (2013.01); C08L 23/06 (2013.01); C08L 23/0815 (2013.01); C09D 123/06 (2013.01); C09D 123/0815 (2013.01); C08F 110/02 (2013.01)

(58) Field of Classification Search
CPC .. C09D 123/06; C09D 123/0815; C08F 10/02; C08F 110/02; C08F 210/16; C08F 4/25; C08F 4/6555; C08F 4/6546; C08F 210/08; C08F 2/001; C08F 4/6492; C08L 23/06; C08L 23/0815
USPC ........................................... 526/64, 90, 348
See application file for complete search history.

(56) References Cited

U.S. PATENT DOCUMENTS 3,242,150 A 3/1966 Scoggin
3,324,093 A 6/1967 Alleman
3,374,211 A 3/1968 Marwil et al.
3,405,109 A 10/1968 Rohlfing
4,532,311 A 7/1985 Fulks et al.
4,578,879 A 4/1986 Yokoyama et al.
4,582,816 A 4/1986 Miro
4,621,952 A 11/1986 Aronson
4,803,251 A 2/1989 Goode et al.
4,855,370 A 8/1989 Chirillo et al.
5,026,795 A 6/1991 Hogan
5,391,654 A 2/1995 Ahvenainen et al.
2010/0047440 A1* 2/2010 Van Marion .......... C08F 297/08
427/117

FOREIGN PATENT DOCUMENTS

| EP | 0 250 169 | 12/1987 |
|---|---|---|
| EP | 0 188 125 | 5/1990 |
| EP | 0 428 054 | 5/1991 |
| EP | 0 560 035 | 9/1993 |
| EP | 0 579 426 | 1/1994 |
| EP | 0 600 414 | 6/1994 |
| EP | 0 479 186 | 3/1995 |
| EP | 0 679 704 | 11/1995 |
| EP | 0 688 794 | 12/1995 |
| EP | 0 696 293 | 2/1996 |
| EP | 0 721 798 | 7/1996 |
| EP | 0 699 213 | 2/1998 |
| EP | 0 684 871 | 5/1998 |
| EP | 0 707 513 | 9/1998 |
| EP | 0 891 990 | 1/1999 |
| EP | 1 310 295 | 5/2003 |

(Continued)

OTHER PUBLICATIONS

International Search Report mailed Jan. 20, 2015 for International Application No. PCT/EP2014/002590.

(Continued)

Primary Examiner — William Cheung
(74) Attorney, Agent, or Firm — Richard M. Klein; Fay Sharpe LLP

(57) ABSTRACT

The present application relates to a polyethylene composition comprising a base resin being a copolymer of ethylene with at least one alpha olefin comonomer having from 3 to 12 carbon atoms, the base resin having a density of more than 940.0 kg/m$^3$ and equal to or less than 952.5 kg/m$^3$, determined according to ISO 1 183-1:2004, wherein the composition has a melt flow rate MFR5 (190° C., 5 kg) of 0.10 to 3.0 g/10 min, determined according to ISO 1 133, a storage modulus of G (2 kPa) of 600 Pa to 900 Pa, a shear thinning index SHI2.7/210 of 20 to 50 and the composition has an elongation at break (EB) at −45° C. in dependence of the molar comonomer content (mol. CC) of the base resin following the following equation EB[%]>175[%/mol %]·mol. CC[mol %], whereby the elongation at break (EB) is determined according to ISO 527-1 at a temperature of −45° C. and the molar co-monomer content (mol. CC) reflects the molar content of alpha-olefin comonomer units in the total content of monomer units of the base resin, an article comprising such a polyethylene composition and the use of such a polyethylene composition for the production of an article.

16 Claims, No Drawings

(56) References Cited

FOREIGN PATENT DOCUMENTS

| | | |
|---|---|---|
| EP | 1 316 598 | 6/2003 |
| EP | 1 415 999 | 5/2004 |
| EP | 1 555 292 | 7/2005 |
| EP | 1 591 460 | 11/2005 |
| EP | 2 072 587 A1 | 6/2009 |
| JP | 9-143400 | 6/1997 |
| JP | 11-58607 | 3/1999 |
| JP | 11-106682 | 4/1999 |
| WO | WO 96/32420 | 10/1996 |
| WO | WO 00/29452 | 5/2000 |
| WO | WO 2005/087361 | 9/2005 |
| WO | WO 2006/063771 | 6/2006 |
| WO | WO 2007/025640 | 3/2007 |
| WO | WO 2007/141022 | 10/2007 |
| WO | WO 2011/055230 | 5/2011 |

OTHER PUBLICATIONS

Written Opinion of the International Searching Authority mailed Jan. 20, 2015 for International Application No. PCT/EP2014/002590.

\* cited by examiner

POLYETHYLENE COMPOSITION FOR PIPE AND PIPE COATING APPLICATIONS

The present invention relates to polyethylene, particularly polyethylene for pipe and pipe coating applications. The invention further relates to a process for the production of polyethylene.

BACKGROUND OF THE INVENTION

Numerous polyethylene compositions for the production of pipe are known. Pipe materials are classified such as PE80 or PE100. The service temperature for PE100 is 20° C. The ISO9080 classification guarantees that a PE100 material will have a lifetime of at least 50 years at 20° C. using internal stress of 10 MPa.

JP-11-058607 A2 discloses a steel pipe coated with a polyolefin which shows good low temperature impact resistance at −60° C. In order to achieve these properties, this Japanese patent application proposes the use of a polyethylene resin having a density of from 0.915 to 0.935 g/cm$^3$.

EP 0679704 A1 also deals with improving the impact resistance at low temperatures, such as −45° C. or lower. In order to achieve this aim, this European patent application suggests the use of a blend of high-pressure low-density polyethylene having a density of between 0.915 to 0.930 g/cm$^3$ with an ethylene-olefin copolymer having a density of 0.895 to 0.920 g/cm$^3$.

JP-11-106682 A2 and JP-09-143400 A2 both disclose resin compositions suitable for powder coating, comprising a blend of ethylene polymers, including acid modified ethylene polymers, polyethylenes of various densities and elastomeric components.

EP 1555292 A1 discloses a polymer composition suitable for extrusion coating, for example for preparing multilayered materials, wherein the composition comprises a multimodal high-density polyethylene and a low-density polyethylene.

EP2072587A1 deals with coated pipes having a layer of multimodal polyethylene. The multimodal ethylene copolymer is a copolymer of ethylene with one or more alpha-olefin comonomers having from 4 to 10 carbon atoms and has a weight average molecular weight of from 70000 g/mol to 250000 g/mol and a melt index MFR$_2$ of from 0.05 g/10 min to 5 g/10 min, a melt index MFR$_5$ of from 0.5 to 10 g/10 min and a density of from 945 kg/m$^3$ to 958 kg/m$^3$. The coatings have a high stiffness, good properties at elevated temperatures and acceptable stress-cracking properties.

In several applications such as tanks, drainage systems, soil and waste pipe systems the service temperature is at much lower temperatures. At low temperatures of lower than 0° C., such as −45° C., polyethylene pipes and pipe coatings tend to become brittle.

Especially for steel pipe coating applications installed in low temperature regions like Russia an elongation at break at low temperatures of −45° C. is an important parameter for transport, storage and installation of the coated steel pipes. However, elongation at break decreases with increasing polymer density which is desirable for improving other parameters such as abrasion resistance, stiffness and crystallization speed. Density of a polyethylene resin can be directly influenced by its comonomer content.

WO 2007/141022 discloses a polyethylene composition for steel pipe top coatings which show a good elongation at break at low temperatures of −45° C. The base resins of these compositions, however, have a rather low density of not more than 940 kg/m$^3$.

There is still a need for polyethylene compositions for pipe and pipe coating applications, especially steel pipe top coatings, which have a high low temperature elongation at break at a low comonomer content and thus at a high density of the base resin.

SUMMARY OF THE INVENTION

The present invention is based on the surprising finding that polyethylene pipes and top coatings with an improved balance of properties at low temperatures such as a high elongation at break at −45° C. and good Charpy notched impact strength at 0° C. can be provided if made from a polyethylene composition comprising
a base resin being a copolymer of ethylene with at least one alpha olefin comonomer having from 3 to 12 carbon atoms, the base resin having a density of more than 940.0 kg/m$^3$ and equal to or less than 952.5 kg/m$^3$, determined according to ISO 1183-1:2004,
wherein the composition has a melt flow rate MFR$_5$ (190° C., 5 kg) of 0.10 to 3.0 g/10 min, determined according to ISO 1133, a storage modulus of G' (2 kPa) of 600 Pa to 900 Pa, a shear thinning index SHI$_{2.7/210}$ of 20 to 50 and
the composition has an elongation at break (EB) at −45° C. in dependence of the molar comonomer content (mol. CC) of the base resin following the following equation $$EB[\%] \geq 175[\%/mol\ \%] \cdot mol.\ CC[mol\ \%],$$

whereby the elongation at break (EB) is determined according to ISO 527-1 at a temperature of −45° C. and the molar comonomer content (mol. CC) reflects the molar content of alpha-olefin comonomer units in the total content of monomer units of the base resin.

The polyethylene compositions of the present invention surprisingly not only show improved low temperature properties but also good mechanical properties at higher temperatures, like 23° C.

The present invention insofar provides
a polyethylene composition comprising
a base resin being a copolymer of ethylene with at least one alpha olefin comonomer having from 3 to 12 carbon atoms, the base resin having a density of more than 940.0 kg/m$^3$ and equal to or less than 952.5 kg/m$^3$, determined according to ISO 1183-1:2004,
wherein the composition has a melt flow rate MFR$_5$ (190° C., 5 kg) of 0.10 to 3.0 g/10 min, determined according to ISO 1133, a storage modulus of G' (2 kPa) of 600 Pa to 900 Pa, a shear thinning index SHI$_{2.7/210}$ of 20 to 50 and
the composition has an elongation at break (EB) at −45° C. in dependence of the molar comonomer content (mol. CC) of the base resin following the following equation $$EB[\%] \geq 175[\%/mol\ \%] \cdot mol.\ CC[mol\ \%],$$

whereby the elongation at break (EB) is determined according to ISO 527-1 at a temperature of −45° C. and the molar comonomer content (mol. CC) reflects the molar content of alpha-olefin comonomer units in the total content of monomer units of the base resin.

The present invention further provides a polyethylene composition obtainable by a multistage process, the multistage process comprising
a) polymerizing ethylene in the presence of
   a silica supported Ziegler Natta catalyst having a molar composition of the catalyst including
   Al 1.30 to 1.65 mol/kg silica, preferably 1.33 to 1.63 mol/kg silica, more preferably 1.35 to 1.60 mol/kg silica, Mg 1.25 to 1.61 mol/kg silica, preferably 1.26 to 1.60 mol/kg silica, more preferably 1.30 to 1.55 mol/kg silica, Ti 0.70 to 0.90 mol/kg silica, preferably 0.71 to 0.88 mol/kg silica, more preferably 0.72 to 0.85 mol/kg silica, and having a mean particle size (D50) of 7 to 15 μm, preferably of 8 to 12 μm in a first reactor for obtaining an intermediate material, the intermediate material having a has a melt flow rate $MFR_2$ (190°, 2.16 kg) of 100 to 400 g/10 min; and b) transferring the reaction product to a gas phase reactor
   (i) feeding ethylene and comonomer to the gas phase reactor
   (ii) further polymerizing the intermediate
   to obtain a base resin having a density of more than 940.0 kg/m³ and equal to or less than 952.5 kg/m³, determined according to ISO 1183-1:2004, c) extruding the base resin into a polyethylene composition having a melt flow rate $MFR_5$ (190° C., 5 kg) of 0.10 to 3.0 g/10 min, determined according to ISO 1133, a storage modulus of G' (2 kPa) of 600 Pa to 900 Pa, a shear thinning index $SHI_{2.7/210}$ of 20 to 50 and the composition has an elongation at break (EB) at −45° C. in dependence of the molar comonomer content (mol. CC) of the base resin following the following equation $$EB[\%] \geq 175[\%/mol\ \%] \cdot mol.\ CC[mol\ \%],$$

whereby the elongation at break (EB) is determined according to ISO 527-1 at a temperature of −45° C. and the molar comonomer content (mol. CC) reflects the molar content of alpha-olefin comonomer units in the total content of monomer units of the base resin.

In a further aspect, the present invention provides an article comprising the polyethylene composition according to the present invention.

In yet a further aspect, the present invention provides is concerned with the use of the inventive polyethylene composition for the production of an article.

Thereby, in one embodiment of the present invention the article relates to a pipe or a pipe fitting.

In another embodiment of the present invention the article relates to a pipe, the outer surface of which is coated with a coating layer comprising the polyethylene composition according to the present invention.

The catalyst used in the present invention is preferably prepared by the following method:

(i) preparing a magnesium complex by reacting dialkyl magnesium compound of formula $Mg(R)_2$, where each R are the same or different alkyl groups of 1 to 10 C-atoms, preferably 2 to 10 C-atoms, most preferably butyloctyl magnesium, with an alcohol of formula R'OH, where R' is an alkyl group of 2 to 16 C-atoms, preferably 4 to 10 C-atoms, most preferably with 2-ethyl-hexanol in an aromatic solvent at a molar ratio of 1:1.70 to 1:1.95, preferably 1:1.75 to 1:1.90, (ii) charging calcinated silica having a mean particle size (D50) in the range of 7 to 15 μm, preferably of 8 to 12 μm and an aliphatic hydrocarbon solvent, suitably pentane, into a catalyst preparation reactor, (iii) adding alkyl aluminium chloride compound of formula $AlR_nX_{3-n}$, wherein R is a $C_1$-$C_{10}$ alkyl group, more preferably a $C_2$-$C_6$ alkyl group and most preferably a $C_2$-$C_4$ alkyl group; X is halogen, preferably chloride and n is 1 or 2, preferably 1, and mixing at a temperature of 10 to 70° C., preferably at 20 to 60° C., most preferably at 40 to 50° C., the aluminium compound is preferably ethylaluminium dichloride, (iv) adding the magnesium complex prepared in step i) at 20 to 50° C., preferably at 30 to 50° C., most suitably at 40 to 50° C. in a ratio of 2.40 to 2.70 mol Mg/kg silica, preferably in a ratio of 2.45 to 2.65 mol Mg/kg silica, (v) adding additional aliphatic hydrocarbon solvent, preferably pentane, into the reactor and keeping the temperature at above 40° C., (vi) stirring the mixture for 3 to 5 hours at a temperature of 45 to 55° C., (vii) adding $TiCl_4$ in an amount of 1.40 to 1.65 mol/kg silica during at least 1 hour at 45 to 55° C. to the reactor, (viii) mixing the catalyst mixture at 50 to 60° C. for at least 5 hours, and (ix) drying the catalyst mixture by vacuum and/or with nitrogen flow.

Additions of Al, Mg and Ti compounds are preferably done within 1 to 3 hours and further preferably after each addition step, the mixture is stirred for additional 1 to 6 hours.

DEFINITIONS

A polyethylene composition according to the present invention denotes a polymer derived from at least 50 mol-% ethylene monomer units and additional comonomer units.

An ethylene homopolymer thereby denotes a polymer consisting essentially of ethylene monomer units. Due to the requirements of large-scale polymerization it may be possible that the ethylene homopolymer includes minor amounts of comonomer units, which usually is below 0.1 mol %, preferably below 0.05 mol %, most preferably below 0.01 mol % of the ethylene homopolymer.

The term 'base resin' denotes the polymeric part of the composition without fillers such as carbon black. A person skilled in the art will understand that the measurements as to the base resin require the presence of stabilizers.

In addition to the base resin, usual additives for utilization with polyolefins, such as pigments (e.g. carbon black), stabilizers (e.g. antioxidant agents), antacids and/or anti-UV's, antistatic agents and utilization agents (such as processing aid agents) may be present in the polyethylene composition. Preferably, the amount of these additives is 10 wt % or below, more preferably 8 wt % or below, most preferably 5 wt % or below, of the composition.

Preferably, the composition comprises carbon black in an amount of 8 wt % or below, more preferably in an amount of 1 to 4 wt %, of the total composition.

Further preferred, the amount of additives different from carbon black is 1 wt % or less, more preferably 0.5 wt % or less.

The 'polydispersity index' PI is a rheological measurement of the broadness of the molecular weight distribution curve.

The term 'catalyst system' shall denote the composition formed by the catalyst and the cocatalyst.

General

Base Resin

The base resin according to the present invention is a copolymer of ethylene with at least one alpha olefin comonomer having from 3 to 12 carbon atoms. Preferably the alpha olefin comonomers are selected from alpha olefins having from 4 to 8 carbon atoms, such as 1-butene, 1-hexene, 4-methyl-1-pentene and 1-octene. Especially preferred are 1-butene and 1-hexene.

The ethylene copolymer may further comprise further comonomer units different from alpha olefin comonomers such as dienes, polar comononers or silicon containing comonomers. It is, however, preferred that the ethylene copolymer only contains alpha olefin monomers as comonomer units.

It is especially preferred that the ethylene copolymer contains either 1-butene or 1-hexene as comonomer units.

The content of units derived from at least one alpha olefin comonomer having from 3 to 12 carbon atoms in the base resin is preferably 0.1 to 3.0 mol %, more preferably 0.2 to 2.0 mol %, most preferably 0.3 to 1.5 mol %.

In one embodiment especially suitable for pipe and pipe fitting applications the content of units derived from at least one alpha olefin comonomer having from 3 to 12 carbon atoms in the base resin is preferably at the lower end of the above range. The content of units derived from at least one alpha olefin comonomer having from 3 to 12 carbon atoms in the base resin of this embodiment is preferably 0.1 to 2.0 mol %, more preferably 0.2 to 1.5 mol %, still more preferably 0.3 to 1.2 mol %, and most preferably 0.4 to 0.8 mol %.

In another embodiment especially suitable for pipe coating applications the content of units derived from at least one alpha olefin comonomer having from 3 to 12 carbon atoms in the base resin is preferably at the upper end of the above range. The content of units derived from at least one alpha olefin comonomer having from 3 to 12 carbon atoms in the base resin of this embodiment is preferably 0.25 to 3.0 mol %, more preferably 0.5 to 2.0 mol %, still more preferably 0.75 to 1.5 mol %, and most preferably 1.0 to 1.25 mol %.

Density (Base Resin)

The base resin according to the present invention has a density of more than 940.0 kg/m³ and equal to or less than 952.5 kg/m³. Preferably the density of the base resin is equal to or more than 941.0 kg/m³ and equal to or less than 952.0 kg/m³, more preferably of equal to or more than 942.0 kg/m³ and equal to or less than 951.0 kg/m³.

In one embodiment especially suitable for pipe and pipe fitting applications the density of the base resin is preferably at the upper end of the above range. The density of the base resin of this embodiment is preferably equal to or more than 947.0 kg/m³ and equal to or less than 952.5 kg/m³, more preferably equal to or more than 948.0 kg/m³ and equal to or less than 951.5 kg/m³ and most preferably equal to or more than 949.0 kg/m³ and equal to or less than 951.0 kg/m³.

In another embodiment especially suitable for pipe coating applications the density of the base resin is preferably at the lower end of the above range. The density of the base resin of that embodiment is preferably more than 937.0 kg/m³ and equal to or less than 948.0 kg/m³, more preferably equal to or more than 938.0 kg/m³ and equal to or less than 944.0 kg/m³ and most preferably equal to or more than 939.0 kg/m³ and equal to or less than 942.0 kg/m³.

Elongation at Break (−45° C.)

The composition according to the invention has an elongation at break (EB) at −45° C. in dependence of the molar comonomer content (mol. CC) of the base resin following the following equation $$EB[\%] \geq 175[\%/mol\ \%] \cdot mol.\ CC[mol\ \%].$$

Preferably the elongation at break (EB) at −45° C. of the composition in dependence of the molar comonomer content (mol. CC) of the base resin follows the following equation $$EB[\%] \geq 200[\%/mol\ \%] \cdot mol.\ CC[mol\ \%],$$

more preferably follows the following equation $$EB[\%] \geq 250[\%/mol\ \%] \cdot mol.\ CC[mol\ \%],$$

and most preferably follows the following equation $$EB[\%] \geq 300[\%/mol\ \%] \cdot mol.\ CC[mol\ \%].$$

The elongation at break (EB) is determined according to ISO 527-1 at a temperature of −45° C. and the molar comonomer content (mol. CC) reflects the molar content of alpha-olefin comonomer units in the total content of monomer units of the base resin.

The base resin preferably comprises at least two ethylene homo- or copolymer fractions (A) and (B) being different in their weight average molecular weight Mw, wherein fraction (A) is an ethylene homopolymer and fraction (B) is a copolymer of ethylene and at least one alpha-olefin comonomer units with 3 to 12 carbon atoms, whereby fraction (A) has a melt flow rate MFR$_2$ (190°, 2.16 kg) of 100 to 400 g/10 min, whereby fraction (A) is present in an amount of 44 to 54 wt.-%. with respect to the base resin.

Ethylene homopolymer fraction (A) preferably has a melt flow rate MFR$_2$ (190°, 2.16 kg) of 150 to 350 g/10 min, more preferably of 200 to 300 g/10 min.

Fraction (A) preferably has a density of at least 970 kg/m³.

Further, fraction (A) is preferably present in the base resin in an amount of 45 to 53 wt.-% and most preferably 46 to 52 wt.-% with respect to the base resin.

Fraction (B) is a copolymer of ethylene and at least one alpha-olefin comonomer units with 3 to 12 carbon atoms. Preferably the alpha olefin comonomers are selected from alpha olefins having from 4 to 8 carbon atoms, such as 1-butene, 1-hexene, 4-methyl-1-pentene and 1-octene. Especially preferred are 1-butene and 1-hexene.

Fraction (B) may further comprise further comonomer units different from alpha olefin comonomers such as dienes, polar comononers or silicon containing comonomers. It is, however, preferred that the fraction (B) only contains alpha olefin monomers as comonomer units.

It is especially preferred that the fraction (B) contains either 1-butene or 1-hexene as comonomer units.

The content of units derived from at least one alpha olefin comonomer having from 3 to 12 carbon atoms in fraction (B) is preferably 0.4 to 5.5 mol %, more preferably 0.5 to 5.0 mol %, most preferably 0.6 to 4.5 mol %.

Optionally, the base resin further comprises a prepolymer fraction. The prepolymer fraction preferably is an ethylene homopolymer. The prepolymer fraction is preferably present in an amount of 0 to 5 wt.-%, more preferably in an amount of 0.2 to 2.5 wt.-% and most preferably in an amount of 0.5 to 1.5 wt.-%.

In one embodiment of the present invention the base resin consists only of above defined fractions (A) and (B).

In another embodiment of the present invention the base resin consists of fractions (A) and (B) and a prepolymer fraction as defined above.

The latter embodiment is preferred to the former embodiment.

Polyethylene Composition

The polyethylene composition is further characterized by the following properties:

Rheological Properties

The polyethylene composition is further characterized by the following specific properties.

PI

The polyethylene composition preferably has a polydispersity index PI within the range of equal to or higher than 1.5 Pa$^{-1}$ and equal to or less than 3.0 Pa$^{-1}$, more preferably within the range of equal to or higher than 1.7 Pa$^{-1}$ and equal to or less than 2.5 Pa$^{-1}$.

$SHI_{2.7/210}$

The polyethylene composition has a shear thinning index $SHI_{2.7/210}$ of 20 to 50, more preferably a shear thinning index $SHI_{2.7/210}$ of 21 to 45, and most preferably a shear thinning index $SHI_{2.7/210}$ of 22 to 40.

The shear thinning index $SHI_{2.7/210}$ can be modified for a given catalyst system by varying the relative amounts of low and high molecular weight material (via split of the reactors) and by varying the molecular weights of the respective low and high molecular weight materials for example by variation of the chain transfer agent feed. Moreover, different catalyst systems result in a specific intrinsic shear thinning index.

$SHI_{1/100}$

The polyethylene composition preferably has an extrapolated shear thinning index $SHI_{1/100}$ of 5 to 20, more preferably 7 to 18 and most preferably 10 to 16.

The shear thinning index $SHI_{1/100}$ can be modified as explained above for the $SHI_{2.7/210}$ shear thinning index. Moreover, the shear thinning index $SHI_{1/100}$ is particularly sensitive to the molecular weight distribution provided intrinsically by a catalyst system.

G'(5 kPa)

The polyethylene composition according to the present invention preferably has a storage modulus of G' (5 kPa) of 2000 Pa to 2700 Pa, more preferably 2100 Pa to 2550 Pa, and most preferably 2150 Pa to 2500 Pa.

G'(2 kPa)

The polyethylene composition according to the present invention has a storage modulus of G' (2 kPa) of 600 Pa to 900 Pa, more preferably 650 Pa to 880 Pa, even more preferably 700 Pa to 860 Pa and most preferably 720 Pa to 845 Pa.

The storage modulus is significantly influenced by the amount of very high molecular weight material. Lower values of storage modulus of G' (2 kPa) indicate a narrow molecular weight distribution from qualitative and general point of view.

Complex Viscosity eta0.05 rad/s

The polyethylene composition according to the present invention preferably has a complex viscosity at 0.05 rad/s eta* of 100 000 Pa·s to 220 000 Pa·s, more preferably 115 000 Pa·s to 200 000 Pa·s, even more preferably 120 000 Pa·s to 180 000 Pa·s and most preferably 130 000 Pa·s to 170 000 Pa s.

Complex Viscosity eta300 rad/s

The polyethylene composition according to the present invention preferably has a complex viscosity at 300 rad/s eta* of 1050 Pa·s to 1750 Pa s, more preferably 1200 Pa·s to 1600 Pa s, and most preferably 1250 Pa·s to 1500 Pa s.

Viscosity at a Constant Shear Stress of 747 Pa eta747

The polyethylene composition according to the present invention preferably has a viscosity at a constant shear stress of 747 Pa of 150 000 Pa·s to 750 000 Pa·s, more preferably 220 000 Pa·s to 600 000 Pa·s and most preferably 270 000 Pa·s to 550 000 Pa·s.

The viscosity at a constant shear stress of 747 Pa is influenced by the weight average molecular weight and is a measure for the sagging properties of the polyethylene composition.

The rheological properties, such as PI, $SHI_{2.7/210}$, $SHI_{1/100}$, G'(5 kPa), G'(2 kPa), eta0.05 rad/s, eta300 rad/s and eta747 described above, have been determined on the polyethylene composition which differs from the base resin by comprising additional components such as carbon black. These properties, however, can also be determined on the base resin. The rheological properties determined on the base resin are preferably in the same ranges as when determined on the polyethylene composition.

$MFR_5$

The composition according to the present invention has a melt flow rate $MFR_5$ (190° C., 5 kg) of 0.10 to 3.0 g/10 min, preferably 0.15 to 2.7 g/10 min, more preferably 0.20 to 2.5 g/10 min. The $MFR_5$ (190° C., 5 kg) is determined according to ISO 1133.

In one embodiment especially suitable for pipe and pipe fitting applications the $MFR_5$ (190° C., 5 kg) of the composition is preferably at the lower end of the above range. The $MFR_5$ (190° C., 5 kg) of the composition of this embodiment is preferably in the range of 0.10 to 0.40 g/10 min, more preferably in the range of 0.15 to 0.35 g/10 min and most preferably in the range of 0.20 to 0.30 g/10 min.

In another embodiment especially suitable for pipe coating applications the $MFR_5$ (190° C., 5 kg) of the composition is preferably at the upper end of the above range. The $MFR_5$ (190° C., 5 kg) of the composition of that embodiment is preferably in the range of 1.0 to 4.0 g/10 min, more preferably in the range of 1.5 to 3.5 g/10 min and most preferably in the range of 1.8 to 3.0 g/10 min.

$MFR_{21}$

In the embodiment especially suitable for pipe and pipe fitting applications the composition according to the present invention preferably has a melt flow rate $MFR_{21}$ (190° C., 21.6 kg) of 1.5 to 13.5 g/10 min, more preferably 2.5 to 11.0 g/10 min, most preferably 5.0 to 7.5 g/10 min. The $MFR_{21}$ (190° C., 21.6 kg) is determined according to ISO 1133.

In the embodiment especially suitable for pipe coating applications the composition according to the present invention preferably has a melt flow rate $MFR_{21}$ (190° C., 21.6 kg) of 10 to 60 g/10 min, more preferably 20 to 50 g/10 min, most preferably 30 to 45 g/10 min. The $MFR_{21}$ (190° C., 21.6 kg) is determined according to ISO 1133.

$MFR_2$

In the embodiment especially suitable for pipe coating applications the composition according to the present invention preferably has a melt flow rate $MFR_2$ (190° C., 2.16 kg) of 0.20 to 1.5 g/10 min, more preferably 0.35 to 1.3 g/10 min, most preferably 0.4 to 1.2 g/10 min. The $MFR_2$ (190° C., 2.16 kg) is determined according to ISO 1133.

The $MFR_2$ of the composition especially suitable for pipe and pipe fitting applications is usually not clearly characterizable as being well below 0.1 g/10 min.

$FRR_{21/5}$

The polyethylene composition according to present invention preferably has a flow rate ratio $FRR_{21/5}$, being the ratio of $MFR_{21}$ to $MFR_5$, of 15 to 40, more preferably 17 to 35, even more preferably 19 to 30 and most preferably 21 to 28.

Density (Composition)

The composition according to the present invention has a density of more than 945.0 kg/m$^3$ and equal to or less than 966.0 kg/m$^3$, preferably of more than 947.0 kg/m$^3$ and equal to or less than 965.5 kg/m$^3$, most preferably of more than 948.5 kg/m$^3$ and equal to or less than 965.0 kg/m$^3$ determined according to ISO 1183-1:2004.

The density of the composition is influenced by the density of the base resin and can further be adjusted by the amount of filler, usually carbon black, in the composition.

The density of the base resin is mainly influenced by the amount and type of comonomer.

Thus, in view of the discussion of the density of the base resin above the density of the composition of the first embodiment especially suitable for pipe and pipe fittings is preferably at the upper limit of the defined range. The density of the composition of this embodiment is preferably equal to or more than 956.0 kg/m$^3$ and equal to or less than 966.0 kg/m$^3$, more preferably equal to or more than 957.0 kg/m$^3$ and equal to or less than 965.5 kg/m$^3$ and most preferably equal to or more than 958.5 kg/m$^3$ and equal to or less than 965.0 kg/m$^3$.

In the other embodiment especially suitable for pipe coating applications the density of the composition is preferably at the lower limit of the defined range. The density of the composition of that embodiment is preferably equal to or more than 945.0 kg/m$^3$ and equal to or less than 966.0 kg/m$^3$, more preferably equal to or more than 947.0 kg/m$^3$ and equal to or less than 963.5 kg/m$^3$ and most preferably equal to or more than 948.5 kg/m$^3$ and equal to or less than 962.0 kg/m$^3$.

In addition to that, the nature of the polymer originating mainly from the catalyst used as well as the melt flow rate play a role. In addition to that it should be stressed that the comonomer need not be a single comonomer. Mixtures of comonomers are also possible as described above.

Molecular Weight Distribution

The composition according to the present invention has a molecular weight distribution, being the ratio of the weight average molecular weight to the number average molecular weight, Mw/Mn, of 10 to 30, preferably of 13 to 27, more preferably from 15 to 25 and most preferably of 17 to 22.

Charpy Notched Impact Strength (0° C.)

The composition according to the present invention has a Charpy notched impact strength, determined according to ISO 179 eA at a temperature of 0° C., of at least 10 kJ/m$^3$, preferably of at least 15 kJ/m$^3$, more preferably of at least 18 kJ/m$^3$, and most preferably of at least 20 kJ/m$^3$. The upper limit of the Charpy notched impact strength is usually not higher than 50 kJ/m$^3$.

Tensile Modulus (23° C.)

The composition according to the present invention has a tensile modulus, determined according to ISO 527-2:1993 at a temperature of 23° C. of at least 900 MPa, preferably of at least 950 MPa, more preferably of at least 1000 MPa and most preferably of at least 1030 MPa. The upper limit of the tensile modulus at 23° C. is usually not higher than 1800 MPa, preferably not higher than 1500 MPa.

Tensile Properties (−45° C.)

The composition according to the invention has an elongation at break, determined according to ISO 527-1:1993 at a temperature of −45° C., of at least 75%, more preferably of at least 100%, still more preferably of at least 147% and most preferably of at least 200%. The upper limit of the elongation at break at −45° C. is usually not higher than 500%, more preferably not higher than 400%.

The composition according to the invention has tensile strength, determined according to ISO 527-1:1993 at a temperature of −45° C., of at least 35 MPa, more preferably of at least 40 MPa, and most preferably of at least 45 MPa. The upper limit of the tensile strength at −45° C. is usually not higher than 100 MPa, more preferably not higher than 75 MPa.

The composition according to the invention has tensile stress at yield, determined according to ISO 527-1:1993 at a temperature of −45° C., of at least 35 MPa, more preferably of at least 40 MPa, and most preferably of at least 45 MPa. The upper limit of the tensile strength at −45° C. is usually not higher than 100 MPa, more preferably not higher than 75 MPa.

The composition according to the invention has tensile strain at yield, determined according to ISO 527-1:1993 at a temperature of −45° C., of at least 4.0%, more preferably of at least 4.5%, still more preferably of at least 5.0% and most preferably of at least 5.5%. The upper limit of the tensile strain at yield at −45° C. is usually not higher than 10.0%, more preferably not higher than 8.0%.

In a further aspect, the present invention is concerned with a polyethylene composition obtainable by a multistage process, the multistage process comprising a) polymerizing ethylene in the presence of
  a silica supported Ziegler Natta catalyst having a molar composition of the catalyst including
  Al 1.30 to 1.65 mol/kg silica, preferably 1.33 to 1.63 mol/kg silica, more preferably 1.35 to 1.60 mol/kg silica,
  Mg 1.25 to 1.61 mol/kg silica, preferably 1.26 to 1.60 mol/kg silica, more preferably 1.30 to 1.55 mol/kg silica,
  Ti 0.70 to 0.90 mol/kg silica, preferably 0.71 to 0.88 mol/kg silica, more preferably 0.72 to 0.85 mol/kg silica,
  and having a mean particle size (D50) of 7 to 15 μm, preferably of 8 to 12 μm
  in a first reactor
  for obtaining an intermediate material, the intermediate material having a has a melt flow rate MFR$_2$ (190°, 2.16 kg) of 100 to 400 g/10 min; and b) transferring the reaction product to gas phase reactor
  (i) feeding ethylene and comonomer to the gas phase reactor
  (ii) further polymerizing the intermediate
  to obtain a base resin having a density of more than 940.0 kg/m$^3$ and equal to or less than 952.5 kg/m$^3$, determined according to ISO 1183-1:2004, c) extruding the base resin into a polyethylene composition having a melt flow rate MFR$_5$ (190° C., 5 kg) of 0.10 to 3.0 g/10 min, determined according to ISO 1133, a storage modulus of G' (2 kPa) of 600 Pa to 900 Pa, a shear thinning index SHI$_{2.7/210}$ of 20 to 50 and the composition has an elongation at break (EB) at −45° C. in dependence of the molar comonomer content (mol. CC) of the base resin following the following equation $$EB[\%] \geq 175[\%/mol\ \%] \cdot mol.\ CC[mol\ \%],$$

whereby the elongation at break (EB) is determined according to ISO 527-1 at a temperature of −45° C. and the molar comonomer content (mol. CC) reflects the molar content of alpha-olefin comonomer units in the total content of monomer units of the base resin.

The intermediate material preferably comprises, more preferably consists of fraction (A) and the optional prepolymer fraction as defined above.

The base resin and the polyethylene composition obtainable by the above described multistage process are preferably further defined by the properties of the base resin and the polyethylene composition described above.

Article

In yet a further aspect, the present invention is concerned with an article comprising the polyethylene composition as described above.

Thereby, in one embodiment of the present invention the article relates to a pipe or a pipe fitting.

In another embodiment of the present invention the article relates to a pipe, the outer surface of which is coated with a coating layer comprising the polyethylene composition according to the present invention. The coating of the outer surface of the pipe preferably comprises a three layer coating, whereby the innermost coating layer is a corrosion preventing layer, the middle layer is an adhesive layer and the outer coating layer is a polyethylene layer (top coating layer). Thereby, the top coating layer preferably comprises the polyethylene composition according to the present invention.

Process

The inventive polyethylene composition is produced by polymerising respectively copolymerising ethylene in a reactor cascade formed by at least a first reactor and a second reactor, whereby the first reactor preferably is a loop reactor and further preferably, the second reactor is a gas phase reactor.

The polymerization applies a silica supported catalyst having a molar composition of the catalyst including Al: 1.30 to 1.65 mol/kg silica, Mg: 1.25 to 1.61 mol/kg silica, and Ti: 0.70 to 0.90 mol/kg silica.

The average particle size of the catalysts used in the field is typically from 10 to 100 μm. However, according to the present invention, it has turned out that special advantages can be obtained if the catalyst has a mean particle size from (D50) of 7 to 15 μm, preferably from 8 to 12 μm.

The catalyst particle size is mainly influenced by the particle size of the support material, in the present case silica support material. Thus, suitable support materials for the catalyst used in the present invention are silica support materials having reasonable small particle size, i.e. silica with a mean particle size (D50) below 15 μm, preferably 7 to 15 μm, like 8 to 12 μm. One example of suitable silica support is, Sylopol2100, produced and marketed by Grace.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is the most preferred alcohol.

The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. An especially preferred titanium compound is titanium tetrachloride.

The catalyst can be prepared by sequentially contacting the carrier with the above mentioned compounds as described in EP-A-688794. Alternatively, it can be prepared by first preparing a solution from the components and then contacting the solution with a carrier as described in WO-A-01155230. Preferably the catalyst is prepared according to the general preparation concept as disclosed in EP-A-688794 and described in detail in the present application.

The catalyst as described above is used together with a cocatalyst, also called activator. Suitable cocatalysts are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, trihexylaluminium and tri-n-octylaluminium. Especially preferred cocatalysts are trialkylaluminiums, of which triethylaluminium, trimethylaluminium and tri-isobutylaluminium are particularly used, most preferably triethylaluminium (TEA).

The catalyst as described above is contacted with the cocatalyst as described above. The contacting of the catalyst and the cocatalyst can either be conducted prior to introducing the catalyst into the polymerization reactor, or it can be conducted by introducing the two components separately into the polymerization reactor(s).

In the catalyst system according to the present invention, i.e. the combination of the catalyst and the cocatalyst according to the present invention, the molar ratio between the aluminium in said cocatalyst and the titanium of said catalyst is preferably 20:1 to 5:1, more preferably 15:1 to 7:1 and most preferably 12:1 to 8:1.

Process Details

The temperature in the first reactor, preferably the slurry phase reactor, more preferably the loop reactor, is typically from 50 to 115° C., preferably from 60 to 110° C. and in particular from 70 to 100° C. The pressure is typically from 1 to 150 bar, preferably from 1 to 100 bar.

The first reaction stage in principle may be conducted in any reactor. Preferably, the first reactor is a slurry reactor. The slurry phase polymerisation may be conducted in any known reactor used for slurry phase polymerisation. Such reactors include a continuous stirred tank reactor and a loop reactor. It is especially preferred to conduct the polymerisation in a loop reactor. In such reactors the slurry is circulated with a high velocity along a closed pipe by using a circulation pump. Loop reactors are generally known in the art and examples are given, for instance, in U.S. Pat. No. 4,582,816, U.S. Pat. No. 3,405,109, U.S. Pat. No. 3,324,093, EP-A-479 186 and U.S. Pat. No. 5,391,654.

It is sometimes advantageous to conduct the slurry phase polymerisation above the critical temperature and pressure of the fluid mixture. Such operations are described in U.S. Pat. No. 5,391,654. In such an operation the temperature is typically at least 85° C., preferably at least 90° C. Furthermore the temperature is typically not higher than 110° C., preferably not higher than 105° C. The pressure under these conditions is typically at least 40 bar, preferably at least 50 bar. Furthermore, the pressure is typically not higher than 150 bar, preferably not higher than 100 bar. In a preferred embodiment the slurry phase polymerization step, is carried out under supercritical conditions whereby the reaction temperature and reaction pressure are above equivalent critical points of the mixture formed by hydrocarbon medium, monomer, hydrogen and optional comonomer and the polymerization temperature is lower than the melting temperature of the polymer formed.

The slurry may be withdrawn from the slurry phase reactor either continuously or intermittently. A preferred way of intermittent withdrawal is the use of settling legs where the slurry is allowed to concentrate before withdrawing a batch of the concentrated slurry from the reactor. The use of settling legs is disclosed, amongst others, in U.S. Pat. No. 3,374,211, U.S. Pat. No. 3,242,150 and EP-A-1 310

295. Continuous withdrawal is disclosed, amongst others, in EP-A-891 990, EP-A-1 415 999, EP-A-1 591 460 and WO-A-2007/025640. The continuous withdrawal is advantageously combined with a suitable concentration method as disclosed in EP-A-1 415 999 and EP-A-1 591 460.

Settling legs are used to concentrate the slurry that is withdrawn from the reactor. The withdrawn stream thus contains more polymer per volume than the slurry within the reactor in average. This has the benefit that less liquid needs to be recycled back to the reactor and thereby the costs of the equipment are lower. In commercial scale plants the fluid which is withdrawn with the polymer evaporates in a flash tank and from there it is compressed with a compressor and recycled into the slurry phase reactor.

However, the settling legs withdraw the polymer intermittently. This causes the pressure and also other variables in the reactor to fluctuate with the period of the withdrawal. Also the withdrawal capacity is limited and depends on the size and number of settling legs. To overcome these disadvantages continuous withdrawal is often preferred.

The continuous withdrawal, on the other hand, has the problem that it typically withdraws the polymer in the same concentration as it is present within the reactor. To reduce the amount of hydrocarbons to be compressed the continuous outlet is advantageously combined with a suitable concentration device, such as a hydrocyclone or sieve, as disclosed in EP-A-1 415 999 and EP-A-1 591 460. The polymer-rich stream is then directed to a flash and the polymer-lean steam is returned directly into the reactor.

For adjusting the $MFR_2$ of the polyethylene fraction polymerised in the slurry phase reactor preferably hydrogen is introduced into the reactor. The hydrogen feed is preferably adjusted to the ethylene feed in order to fulfil a hydrogen to ethylene ratio in the slurry phase reactor of 300 to 750 mol/kmol, more preferably of 400 to 600 mol/kmol.

The polyethylene fraction produced in the slurry phase reactor is an ethylene homopolymer fraction.

If polymerising a copolymer, comonomers preferably are selected from the group comprising 1-butene, 1-hexene, 4-methyl-1-pentene, 1-octene or their mixtures, especially preferred are 1-butene and 1-hexene. In a preferred embodiment in the slurry phase reactor an ethylene homopolymer is polymerised so that no comonomer is fed to this reaction stage.

The residence time and the polymerisation temperature in the slurry phase reactor are adjusted as such as to polymerise an ethylene homopolymer fraction typically in an amount of 44 to 54 wt %, preferably 45 to 53 wt % and most preferably 46 to 52 wt % of the total polyethylene base resin.

The polymer fraction produced in the slurry phase reactor preferably is transferred to a gas phase reactor.

In a fluidised bed gas phase reactor an olefin is polymerised in the presence of a polymerisation catalyst in an upwards moving gas stream. The reactor typically contains a fluidised bed comprising the growing polymer particles containing the active catalyst located above a fluidisation grid.

The polymer bed is fluidised with the help of a fluidisation gas comprising the olefin monomer, eventually comonomer(s), eventually chain growth controllers or chain transfer agents, such as hydrogen, and eventually inert gas. The inert gas can thereby be the same or different as the inert gas used in the slurry phase reactor. The fluidisation gas is introduced into an inlet chamber at the bottom of the reactor. To make sure that the gas flow is uniformly distributed over the cross-sectional surface area of the inlet chamber the inlet pipe may be equipped with a flow dividing element as known in the art, e. g. U.S. Pat. No. 4,933,149 and EP-A-684 871.

From the inlet chamber the gas flow is passed upwards through the fluidisation grid into the fluidised bed. The purpose of the fluidisation grid is to divide the gas flow evenly through the cross-sectional area of the bed. Sometimes the fluidisation grid may be arranged to establish a gas stream to sweep along the reactor walls, as disclosed in WO-A-2005/087261. Other types of fluidisation grids are disclosed, amongst others, in U.S. Pat. No. 4,578,879, EP 600 414 and EP-A-721 798. An overview is given in Geldart and Bayens: The Design of Distributors for Gas-fluidised Beds, Powder Technology, Vol. 42, 1985.

The fluidisation gas passes through the fluidised bed. The superficial velocity of the fluidisation gas must be higher than the minimum fluidisation velocity of the particles contained in the fluidised bed, as otherwise no fluidisation would occur. On the other hand, the velocity of the gas should be lower than the onset velocity of pneumatic transport, as otherwise the whole bed would be entrained with the fluidisation gas. The minimum fluidisation velocity and the onset velocity of pneumatic transport can be calculated when the particle characteristics are known by using common engineering practice. An overview is given, amongst others, in Geldart: Gas Fluidisation Technology, J. Wiley & Sons, 1996.

When the fluidisation gas is contacted with the bed containing the active catalyst the reactive components of the gas, such as monomers and chain transfer agents, react in the presence of the catalyst to produce the polymer product. At the same time the gas is heated by the reaction heat.

The unreacted fluidisation gas is then removed from the top of the reactor, compressed and recycled into the inlet chamber of the reactor. Prior to the entry into the reactor fresh reactants are introduced into the fluidisation gas stream to compensate for the losses caused by the reaction and product withdrawal. It is generally known to analyse the composition of the fluidisation gas and introduce the gas components to keep the composition constant. The actual composition is determined by the desired properties of the product and the catalyst used in the polymerisation.

After that the gas is cooled in a heat exchanger to remove the reaction heat. The gas is cooled to a temperature which is lower than that of the bed to prevent the bed from being heated because of the reaction. It is possible to cool the gas to a temperature where a part of it condenses. When the liquid droplets enter the reaction zone they are vaporized. The vaporisation heat then contributes to the removal of the reaction heat. This kind of operation is called condensed mode and variations of it are disclosed, amongst others, in WO-A-2007/025640, U.S. Pat. No. 4,543,399, EP-A-699 213, and WO-A-94/25495. It is also possible to add condensing agents into the recycle gas stream, as disclosed in EP-A-696 293. The condensing agents are non-polymerisable components, such as propane, n-pentane, isopentane, n-butane or isobutane, which are at least partially condensed in the cooler.

The polymeric product may be withdrawn from the gas phase reactor either continuously or intermittently. Combinations of these methods may also be used. Continuous withdrawal is disclosed, amongst others, in WO-A-00/29452. Intermittent withdrawal is disclosed, amongst others, in U.S. Pat. No. 4,621,952, EP-A-188 125, EP-A-250 169 and EP-A-579 426.

The top part of the at least one gas phase reactor may include a so called disengagement zone. In such a zone the diameter of the reactor is increased to reduce the gas velocity and allow the particles that are carried from the bed with the fluidisation gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain time-averaged bed levels.

Also antistatic agent(s) may be introduced into the at least one gas phase reactor if needed. Suitable antistatic agents and methods to use them are disclosed, amongst others, in U.S. Pat. No. 5,026,795, U.S. Pat. No. 4,803,251, U.S. Pat. No. 4,532,311, U.S. Pat. No. 4,855,370 and EP-A-560 035. They are usually polar compounds and include, amongst others, water, ketones, aldehydes alcohols.

The reactor may include a mechanical agitator to further facilitate mixing within the fluidised bed. An example of suitable agitator design is given in EP-A-707 513.

The temperature in the gas phase polymerisation in the gas phase reactor typically is at least 70° C., preferably at least 80° C. The temperature typically is not more than 105° C., preferably not more than 95° C. The pressure is typically at least 10 bar, preferably at least 15 bar but typically not more than 30 bar, preferably not more than 25 bar.

For adjusting the melt flow rate of the polyethylene fraction polymerised in the first gas phase reactor hydrogen is introduced into the reactor. The hydrogen feed is preferably adjusted to the ethylene feed in order to fulfil a hydrogen to ethylene ratio in the first gas phase reactor of 0.1 to 25 mol/kmol, more preferably of 0.5 to 20 mol/kmol and most preferably 1.5 to 17 mol/kmol.

In the gas phase reactor preferably an ethylene copolymer fraction is produced. The fluidisation gas stream thus comprises comonomers preferably selected from the group consisting of alpha-olefin comonomers with 3 to 12 carbon atoms, more preferably 4 to 8 carbon atoms. Suitable alpha-olefin comonomer species are 1-butene, 1-hexene and 1-octene. 1-butene and 1-hexene are mostly preferred. The comonomer used in the first gas phase reactor may be the same or different to that used in the slurry phase reactor. The comonomer feed is preferably adjusted to the ethylene feed in order to fulfil a comonomer to ethylene ratio of at least 50 to 250 mol/kmol, more preferably 60 to 150 mol/kmol, most preferably 70 to 100 mol/kmol.

The residence time and the polymerisation temperature in the gas phase reactor are adjusted as such as to polymerise an ethylene copolymer fraction typically in an amount of 45 to 55 wt %, preferably 46 to 54 wt % and most preferably 47 to 53 wt % of the total polyethylene resin.

Further, the final polyethylene base resin emerging from the gas phase reactor, preferably consisting of fractions (A), and (B) optionally together with a prepolymer fraction, preferably has a density of more than 940.0 kg/m$^3$ and equal to or less than 952.5 kg/m$^3$. Preferably the density of the base resin is equal to or more than 941.0 kg/m$^3$ and equal to or less than 952.0 kg/m$^3$, more preferably of equal to or more than 942.0 kg/m$^3$ and equal to or less than 951.0 kg/m$^3$.

Preferably the density of the polymer resin consisting of fractions (A) optionally together with a prepolymer fraction, is higher than that of the base resin consisting of fractions (A), and (B) optionally together with a prepolymer fraction.

The catalyst system can be fed to any polymerisation stage but preferably is fed to the first polymerisation stage. Most preferably the catalyst system is only fed to the first polymerisation stage. The catalyst may be transferred into the polymerisation zone by any means known in the art. It is thus possible to suspend the catalyst in a diluent and maintain it as homogeneous slurry. Especially preferred is to use oil having a viscosity from 20 to 1500 mPa*s as diluent, as disclosed in WO-A-2006/063771. It is also possible to mix the catalyst with a viscous mixture of grease and oil and feed the resultant paste into the polymerisation zone. Still further, it is possible to let the catalyst settle and introduce portions of thus obtained catalyst mud into the polymerisation zone in a manner as disclosed, for instance, in EP-A-428 054.

In one embodiment of the present invention the process may further comprise a pre-polymerisation step which precedes the polymerisation steps. The purpose of the pre-polymerisation is to polymerise a small amount of polymer onto the catalyst at a low temperature and/or a low monomer concentration. By pre-polymerisation it is possible to improve the performance of the catalyst in slurry and/or modify the properties of the final polymer. The pre-polymerisation step may be conducted in slurry or gas phase. Preferably the pre-polymerisation is conducted in slurry, preferentially a loop reactor. Thus, the pre-polymerisation step may be conducted in a loop reactor. The pre-polymerisation is then preferably conducted in an inert diluent, typically a hydrocarbon diluent such as methane, ethane, propane, n-butane, isobutene, pentanes, hexanes, heptanes, octanes etc., or their mixtures. Preferably the diluent is a low boiling hydrocarbon having from 1 to 4 carbon atoms or a mixture of such hydrocarbons. The most preferred diluent is propane.

The temperature in the pre-polymerisation step is typically from 0° C. to 90° C., preferably from 20° C. to 80° C., more preferably from 55° C. to 75° C.

The pressure is not critical and is typically from 1 bar to 150 bar, preferably from 10 bar to 100 bar. The molecular weight of the prepolymer may be controlled by hydrogen as it is known in the art. Further, antistatic additives may be used to prevent the particles from adhering to each other or the walls of the reactor, as disclosed in WO-A-96/19503 and WO-A-96/32420.

The catalyst components are preferably all introduced to the pre-polymerisation step. However, where the solid catalyst component and the cocatalyst can be fed separately it is possible that only a part of cocatalyst is introduced into the pre-polymerisation stage and the remaining part into the subsequent polymerisation stages. Also in such cases it is necessary to introduce as much cocatalyst into the pre-polymerisation stage as necessary to obtain a sufficient polymerisation reaction.

The embodiment including the pre-polymerisation step is preferred. Thus, in a preferred embodiment of the present invention the process does include a pre-polymerization step followed by a polymerization step in a slurry phase reactor and a polymerization step in a gas phase reactor.

The polyethylene composition of the invention preferably is produced in a multi-stage process which further comprises a compounding step, wherein the base resin, which is typically obtained as a base resin powder from the reactor, is extruded in an extruder and then pelletized to polymer pellets in a manner known in the art to form the polyolefin composition of the invention.

Optionally, additives or other polymer components can be added to the composition during the compounding step in an amount as described above. Preferably, the composition of the invention obtained from the reactor is compounded in the extruder together with additives in a manner known in the art.

The extruder may be e.g. any conventionally used extruder. As an example of an extruder for the present compounding step may be those supplied by Japan Steel works, Kobe Steel or Farrel-Pomini, e.g. JSW 460P or JSW CIM90P.

In one embodiment, the extrusion step is carried out using feed rates of 100 kg/h to 500 kg/h, more preferably 150 kg/h to 300 kg/h. Preferably, the throughput is typically from 10 to 50 tons/h in commercial production.

The screw speed of the extruder is preferably 250 rpm to 450 rpm, more preferably 300 rpm to 400 rpm.

Preferably, in said extrusion step the SEI (specific energy input) of the extruder may be 150 kWh/ton to 250 kWh/ton, more preferably 180 kWh/ton to 230 kWh/ton, whereby the SEI is directly calculated from the electric input of the extruder ignoring the intrinsically limited effectiveness.

The melt temperature in said extrusion step is preferably 200° C. to 300° C., more preferably 230° C. to 270° C.

Preferably the temperatures at the zones of an extruder having 4 zones are set as follows: Zone 1 is preferably set to 80 to 120° C. Zone 2 is preferably set to 180 to 220° C. Zone 3 is preferably set to 230 to 270° C. Zone 4 is preferably set to 160 to 200° C.

More preferably the 4 zones are set as follows: Zone 1 from 90 to 110° C.; zone 2 from 190 to 210° C.; zone 3 from 240 to 260° C.; and zone 4 from 170 to 190° C.

Pipe Production

Polymeric pipes are generally manufactured by extrusion, or, to a small extent, by injection moulding. A conventional plant for extrusion of polymer pipes comprises an extruder, a die-head, a calibrating device, cooling equipment, a pulling device, and a device for cutting and/or for coiling up the pipe.

The manufacture of polyethylene materials for use in pressure pipes is discussed in an article by Scheirs et al (Scheirs, Böhm, Boot and Leevers: PE100 Resins for Pipe Applications, TRIP Vol. 4, No. 12 (1996) pp. 408-415). The authors discuss the production technology and properties of PE100 pipe materials. They point out the importance of proper comonomer distribution and molecular weight distribution in order to optimize slow crack growth and rapid crack propagation.

Pipe Coating

Pipes, preferably metallic pipes and most preferably steel-pipes are coated with a three-layer coating usually according to the following procedure:

It is preferable to properly prepare the surface of the pipe before coating as it is known in the art. The pipe surface is typically inspected for any rust, dirt, flaws, discontinuities, and metal defects. All the excess material needs be removed from the pipe surface to make sure that the coating is properly adhered to the pipe. Suitable cleaning methods include air and water high pressure washing, grit or shot blasting and mechanical brushing. Also acid wash and chromate pre-treatment is sometimes used.

Typically the pipes are heated with induction heating up to about 200° C. The temperature is adjustable depending on the line speed and the material being used in the corrosion preventing layer. When the epoxy Teknos AR8434 is used the steel pipe is preferably heated to 190° C. The temperature decreases slightly during the coating process.

If epoxy powder (at 23° C.) is used it is typically sprayed on with epoxy guns, where the speed of the rotating pipe is about 9 m/min. The thickness of the epoxy and other coating materials are set in accordance with end use specified requirements. Normal thickness value for the epoxy layer (on-shore installations) is from 70 to 200 µm, such as 135 µm.

Materials that may be used in the corrosion protection layer are, for instance, epoxy resins and organosilicon compounds. Examples of suitable epoxy resins are phenol-based epoxies and amine-based epoxies. These kinds of epoxies are sold, among others, under trade names of AR8434 (of Teknos), Scotchkote 226N (of 3M) and PE50-7191 (of BASF). Suitable organosilicon compounds have been disclosed in EP-A-1859926.

The extrusion of the adhesive layer and the top-coating layer may be performed, for instance, with two single screw extruders. They may have a diameter of, for instance, from 30 to 100 mm, such as 60 mm, and a length of from 15 to 50 L/D, such as 30 L/D. The temperature is typically controlled in several zones and the temperature of the PE adhesive and coating layer after the die is from 190 to 300° C., such as 225 and 250° C., respectively. Die widths are from 50 to 300 mm, such as 110 mm and 240 mm for the adhesive layer and coating layer, respectively. Both adhesive layer and the coating layer are usually rolled tightly onto the pipe with a silicone pressure roller. The thickness of the adhesive layer is typically from 200 to 400 µm, such as 290 µm. The thickness of the coating layer is typically from 1 to 5 mm, preferably from 2 to 4 mm, such as 3.2 mm.

Materials suitable to be used in the adhesion layer are, for instance, acid or acid anhydride grafted olefin polymers, like polyethylene or polypropylene. Suitable polymers are, among others, fumaric acid modified polyethylene, fumaric acid anhydride modified polyethylene, maleic acid modified polyethylene, maleic acid anhydride modified polyethylene, fumaric acid modified polypropylene, fumaric acid anhydride modified polypropylene, maleic acid modified polypropylene and maleic acid anhydride modified polypropylene. Examples of especially suitable adhesion plastics are given in EP-A-1316598.

The top coating layer preferably comprises the polyethylene composition according to the present invention.

After the coating the coated pipe is cooled, for instance by providing water flow on the coated pipe surface.

Use

Furthermore, the present invention relates to an article, preferably a pipe or pipe fitting or a pipe, the outer surface of which is coated with a coating layer, comprising a polyethylene composition as described above or obtainable by a process as described above, and to the use of such a polyethylene composition for the production of an article, preferably a pipe a pipe fitting or a coated pipe.

EXAMPLES

1. Definitions a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_5$ of polyethylene is measured at a temperature 190° C. and a load of 5 kg, the $MFR_2$ of polyethylene at a temperature 190° C. and a load of 2.16 kg and the $MFR_{21}$ of polyethylene is measured at a temperature of 190° C. and a load of 21.6 kg. The quantity FRR (flow rate ratio) denotes the ratio of flow rates at different loads. Thus, $FRR_{21/5}$ denotes the value of $MFR_{21}/MFR_5$.

b) Density

Density of the polymer was measured according to ISO 1183-1:2004 Method A on compression moulded specimen prepared according to EN ISO 1872-2 (February 2007) and is given in kg/m'.

c) Comonomer Content

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. {[1], [2], [6]} Standard single-pulse excitation was employed utilising the transient NOE at short recycle delays of 3s {[1], [3]} and the RS-HEPT decoupling scheme {[4], [5]}. A total of 1024 (1 k) transients were acquired per spectrum. This setup was chosen due its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm {[9]}.

Characteristic signals corresponding to the incorporation of 1-hexene were observed {[9]} and all contents calculated with respect to all other monomers present in the polymer.

$H = I_{*B4}$

With no other signals indicative of other comonomer sequences, i.e. consecutive comonomer incorporation, observed the total 1-hexene comonomer content was calculated based solely on the amount of isolated 1-hexene sequences:

$H_{total} = H$

Characteristic signals resulting from saturated end-groups were observed. The content of such saturated end-groups was quantified using the average of the integral of the signals at 22.84 and 32.23 ppm assigned to the 2s and 2s sites respectively:

$S = (1/2)*(I_{2S} + I_{3S})$

The relative content of ethylene was quantified using the integral of the bulk methylene (δ+) signals at 30.00 ppm:

$E = (1/2)*I_{\delta+}$

The total ethylene comonomer content was calculated based the bulk methylene signals and accounting for ethylene units present in other observed comonomer sequences or end-groups:

$E_{total} = E + (5/2)*B + (3/2)*S$

The total mole fraction of 1-hexene in the polymer was then calculated as:

$fH = (H_{total}/(E_{total} + H_{total})$

The total comonomer incorporation of 1-hexene in mole percent was calculated from the mole fraction in the usual manner:

$H[\text{mol }\%] = 100*fH$

The total comonomer incorporation of 1-hexene in weight percent was calculated from the mole fraction in the standard manner:

$H[\text{wt }\%] = 100*(fH*84.16)/((fH*84.16) + ((1-fH)*28.05))$

[1] Klimke, K., Parkinson, M., Piel, C., Kaminsky, W., Spiess, H. W., Wilhelm, M., Macromol. Chem. Phys. 2006; 207:382.

[2] Parkinson, M., Klimke, K., Spiess, H. W., Wilhelm, M., Macromol. Chem. Phys. 2007; 208:2128.

[3] Pollard, M., Klimke, K., Graf, R., Spiess, H. W., Wilhelm, M., Sperber, O., Piel, C., Kaminsky, W., Macromolecules 2004; 37:813.

[4] Filip, X., Tripon, C., Filip, C., J. Mag. Resn. 2005, 176, 239

[5] Griffin, J. M., Tripon, C., Samoson, A., Filip, C., and Brown, S. P., Mag. Res. in Chem. 2007 45, S1, S198

[6] Castignolles, P., Graf, R., Parkinson, M., Wilhelm, M., Gaborieau, M., Polymer 50 (2009) 2373

[7] Zhou, Z., Kuemmerle, R., Qiu, X., Redwine, D., Cong, R., Taha, A., Baugh, D. Winniford, B., J. Mag. Reson. 187 (2007) 225

[8] Busico, V., Carbonniere, P., Cipullo, R., Pellecchia, R., Severn, J., Talarico, G., Macromol. Rapid Commun. 2007, 28, 1128

[9] J. Randall, Macromol. Sci., Rev. Macromol. Chem. Phys. 1989, C29, 201.

d) Rheological Parameters

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates using nitrogen atmosphere and setting a strain within the linear viscoelastic regime. The oscillatory shear tests were done at 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \quad (1)$$

If the applied strain is within the linear viscoelastic regime, the resulting sinusoidal stress response can be given by $$\sigma(t) = \sigma_0 \sin(\omega t + \delta) \quad (2)$$

where $\sigma_0$, and $\gamma_0$ are the stress and strain amplitudes, respectively; ω is the angular frequency; δ is the phase shift (loss angle between applied strain and stress response); t is the time.

Dynamic test results are typically expressed by means of several different rheological functions, namely the shear storage modulus, G', the shear loss modulus, G", the complex shear modulus, G*, the complex shear viscosity, η*, the dynamic shear viscosity, η', the out-of-phase component of the complex shear viscosity, η" and the loss tangent, tan η, which can be expressed as follows:

$$G' = \frac{\sigma_0}{\gamma_0}\cos\delta [\text{Pa}] \quad (3)$$

$$G'' = \frac{\sigma_0}{\gamma_0}\sin\delta [\text{Pa}] \quad (4)$$

-continued $$G^* = G' + iG'' [\text{Pa}] \quad (5)$$

$$\eta^* = \eta' - i\eta'' [\text{Pa} \cdot \text{s}] \quad (6)$$

$$\eta' = \frac{G''}{\omega} [\text{Pa} \cdot \text{s}] \quad (7)$$

$$\eta'' = \frac{G'}{\omega} [\text{Pa} \cdot \text{s}] \quad (8)$$

The determination of so-called Shear Thinning Index, which correlates with MWD and is independent of Mw, is done as described in equation 9.

$$SHI_{(x/y)} = \frac{Eta^* \text{ for } (G^* = x \text{ kPa})}{Eta^* \text{ for } (G^* = y \text{ kPa})} \quad (9)$$

For example, the $SHI_{(2.7/210)}$ is defined by the value of the complex viscosity, in Pa s, determined for a value of G* equal to 2.7 kPa, divided by the value of the complex viscosity, in Pa s, determined for a value of G* equal to 210 kPa.

The values of storage modulus (G'), loss modulus (G''), complex modulus (G*) and complex viscosity ($\eta$) were obtained as a function of frequency ($\omega$).

Thereby, e.g. $\eta^*_{300rad/s}$ (eta*$_{300rad/s}$) is used as abbreviation for the complex viscosity at the frequency of 300 rad/s and $\eta^*_{0.05rad/s}$ (eta*$_{0.05rad/s}$) is used as abbreviation for the complex viscosity at the frequency of 0.05 rad/s.

The loss tangent tan (delta) is defined as the ratio of the loss modulus (G'') and the storage modulus (G') at a given frequency. Thereby, e.g. $\tan_{0.05}$ is used as abbreviation for the ratio of the loss modulus (G'') and the storage modulus (G') at 0.05 rad/s and $\tan_{300}$ is used as abbreviation for the ratio of the loss modulus (G'') and the storage modulus (G') at 300 rad/s.

The elasticity balance $\tan_{0.05}/\tan_{300}$ is defined as the ratio of the loss tangent $\tan_{0.05}$ and the loss tangent $\tan_{300}$.

Besides the above mentioned rheological functions one can also determine other rheological parameters such as the so-called elasticity index EI(x). The elasticity index Ei(x) is the value of the storage modulus, G' determined for a value of the loss modulus, G'' of x kPa and can be described by equation 10.

$$EI(x)=G' \text{ for } (G''=x \text{ kPa})[\text{Pa}] \quad (10)$$

For example, the EI(5 kPa) is the defined by the value of the storage modulus G', determined for a value of G'' equal to 5 kPa.

The viscosity $eta_{747}$ is measured at a very low, constant shear stress of 747 Pa and is inversely proportional to the gravity flow of the polyethylene composition, i.e. the higher $eta_{747}$ the lower the sagging of the polyethylene composition.

The polydispersity index, PI, is defined by equation 11.

$$PI = \frac{10^5}{G'(\omega_{COP})}, \omega_{COP} = \omega \text{ for } (G' = G'') \quad (11)$$

where $\omega_{COP}$ is the cross-over angular frequency, determined as the angular frequency for which the storage modulus, G', equals the loss modulus, G''.

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "Interpolate y-values to x-values from parameter" and the "logarithmic interpolation type" were applied.

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362
[2] The influence of molecular structure on some rheological properties of polyethylene", Heino, E. L., Borealis Polymers Oy, Porvoo, Finland, Annual Transactions of the Nordic Rheology Society, 1995.).
[3] Definition of terms relating to the non-ultimate mechanical properties of polymers, Pure & Appl. Chem., Vol. 70, No. 3, pp. 701-754, 1998.

e) Molecular Weight

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4: 2003 and ASTM D 6474-99 using the following formulas:

$$M_n = \frac{\sum_{i=1}^{N} A_i}{\sum (A_i / M_i)} \quad (1)$$

$$M_w = \frac{\sum_{i=1}^{N} (A_i \times M_i)}{\sum A_i} \quad (2)$$

$$M_z = \frac{\sum_{i=1}^{N} (A_i \times M_i^2)}{\sum (A_i / M_i)} \quad (3)$$

For a constant elution volume interval $\Delta V_i$, where $A_i$ and $M_i$ are the chromatographic peak slice area and polyolefin molecular weight (MW).

A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 µL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at 160° C. under continuous gentle shaking in the autosampler of the GPC instrument.

f) Charpy Notched Impact Strength

Charpy impact strength was determined according to ISO179/1eA:2000 on V-notched samples of 80*10*4 mm³ at 0° C. (Charpy impact strength (0° C.)). Samples were cut from plaques of 4 mm thickness prepared by compression molding according to ISO 293:2004 using the conditions defined in chapter 3.3 of ISO 1872-2:2007.

g) Tensile Modulus (23° C.)

As a measure for stiffness, the tensile modulus (E-modulus) of the compositions was measured at 23° C. on compression molded specimens according to ISO 527-2:1993. The specimens (1B type) were cut from plaques of 4 mm thickness prepared by compression molding according to ISO 293:2004 using the conditions defined in chapter 3.3 of ISO 1872-2:2007. The modulus was measured at a speed of 1 mm/min.

h) Tensile Properties (−45° C.)

The tensile strength, including tensile stress at yield, strain at yield and elongation at break (i.e. tensile strain at break) is measured according to ISO 527-1 (cross head speed 50 mm/min) at a temperature of −45° C.

i) Mg, Al and Ti Content/ICP Analysis

The elemental analysis of a catalyst was performed by taking a solid sample of mass, M. Samples were diluted up to a known volume, V, by dissolving in nitric acid ($HNO_3$, 65%, 5% of V) and freshly deionised (DI) water (5% of V). The solution was further treated with hydrofluoric acid (HF, 40%, 3% of V) and diluted with DI water up to the final volume, V, and left to stabilize for two hours.

The analysis was run at room temperature using a Thermo Elemental iCAP 6300 Inductively Coupled Plasma-Optical Emission Spectrometer (ICP-OES) which was calibrated using a blank (a solution of 5% $HNO_3$ and 3% HF), and standards of 0.5 ppm, 1 ppm, 10 ppm, 50 ppm, 100 ppm and 300 ppm of Al, Mg and Ti in solutions of 5% $HNO_3$ and 3% HF.

Immediately before analysis the calibration is 'resloped' using the blank and 100 ppm standard, a quality control sample (20 ppm Al, Mg and Ti in a solution of 5% $HNO_3$, 3% HF in DI water) is run to confirm the reslope. The QC sample is also run after every $5^{th}$ sample and at the end of a scheduled analysis set.

The content of Mg was monitored using the 285.213 nm line and the content for Ti using 336.121 nm line. The content of aluminium was monitored via the 167.079 nm line, when the Al concentration in the ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

j) Particle Size of the Catalyst

Particle size is measured by Coulter Counter LS 200 at room temperature with n-heptane as medium.

2. Examples

Preparation of the Catalyst

Complex Preparation:

87 kg of toluene were added into the reactor. Then 45.5 kg Bomag A (butyloctyl magnesium) in heptane were also added in the reactor. 161 kg 99.8% 2-ethyl-1-hexanol were then introduced into the reactor at a flow rate of 24 to 40 kg/h. The molar ratio between BOMAG-A and 2-ethyl-1-hexanol was 1:1.83.

Solid Catalyst Component Preparation:

330 kg silica (calcined silica, Sylopol® 2100) and pentane (0.12 kg/kg carrier) were charged into a catalyst preparation reactor. Then EADC (Ethylaluminium dichloride) (2.66 mol/kg silica) was added into the reactor at a temperature of below 40° C. during two hours and mixing was continued for one hour. The temperature during mixing was 40-50° C. Then the Mg complex prepared as described above was added (2.56 mol Mg/kg silica) at 50° C. during two hours and mixing was continued at 40-50° C. for one hour. 0.84 kg pentane/kg silica was added into the reactor and the slurry was stirred for 4 hours at the temperature of 40-50° C. Finally, $TiCl_4$ (1.47 mol/kg silica) was added during at least 1 hour at 55° C. to the reactor. The slurry was stirred at 50-60° C. for five hours. The catalyst was then dried by purging with nitrogen.

Molar composition of the ready catalyst component is: Al/Mg/Ti=1.5/1.4/0.8 (mol/kg silica).

Multi-Stage Polymerization for Inventive Example IE1

A loop reactor having a volume of 50 $dm^3$ was operated at 70° C. and 62 bar pressure. For producing a prepolymer fraction 36.4 kg/h of propane diluent, 0.8 kg/h ethylene and 5.0 g/h of a gas mixture containing 25 vol-% of hydrogen in nitrogen were introduced into the reactor. In addition, polymerisation catalyst prepared according to the description above was introduced into the reactor at a rate of 9.9 g/h. The triethylaluminium (TEA) co-catalyst feed was 5.7 g/h. No additional comonomer was introduced into the reactor. The polymerisation rate was 0.7 kg/h and the conditions in the reactor as shown in Table 1.

The polymer slurry was withdrawn from the loop reactor and transferred into a loop reactor having a volume of 500 $dm^3$. This second loop reactor was operated at 95° C. and 57 bar pressure. Into the reactor were introduced 96 kg/h of propane diluent, 34 kg/h ethylene and 134 g/h of a gas mixture containing 25 vol-% of hydrogen in nitrogen. The triethylaluminium (TEA) co-catalyst feed was 5.7 g/h. No additional catalyst feed or comonomer feed was introduced into the reactor. The polymerisation rate was 30.8 kg/h and the conditions in the reactor as shown in Table 1.

The polymer slurry was withdrawn from the second loop reactor and transferred into a flash vessel operated at 3 bar pressure and 70° C. temperature where the hydrocarbons were substantially removed from the polymer. The polymer was then introduced into a gas phase reactor operated at a temperature of 85° C. and a pressure of 20 bar. In addition 42 kg/h ethylene, 1.5 kg/h 1-butene and 3.4 g/h hydrogen was introduced into the reactor. The polymerisation rate was 28 kg/h. The conditions are shown in Table 1.

The resulting polymer was purged with nitrogen (about 50 kg/h) for one hour, stabilised with 2200 ppm of Irganox B225 and 1500 ppm Ca-stearate and then extruded together with 3.0 wt % carbon black to pellets in a counter-rotating twin screw extruder CIM90P (manufactured by Japan Steel Works) so that the throughput was 221 kg/h and the screw speed was 349 rpm.

Multi-Stage Polymerization for Inventive Examples IE2 to IE3

Inventive examples IE2 to IE3 were polymerized using the same catalyst and cocatalyst components and the same reactor configuration as inventive example IE1. The polymerization conditions and feeds to the different reactors as well as the compounding conditions are shown in Table 1.

Multi-Stage Polymerization for Comparative Examples CE1 to CE5

The polymerization was repeated using the commercially available catalyst Lynx200 by BASF. Again TEA was used as cocatalyst. As can be seen from the data in Table 1, this catalyst results in a significantly different balance of properties.

TABLE 1

| | IE1 | IE2 | IE3 | CE1 | CE2 | CE3 | CE4 | CE5 |
|---|---|---|---|---|---|---|---|---|
| Polymerization conditions | | | | | | | | |
| Prepolymerizer: | On | On | On | On | On | On | On | On |
| Temperature [° C.] | 70 | 70 | 70 | 60 | 60 | 60 | 60 | 60 |
| Pressure [bar] | 62 | 62 | 62 | 62 | 61 | 60 | 60 | 60 |
| Catalyst feed [g/h] | 9.9 | 10.0 | 10.2 | 2.4 | 3.8 | 4.2 | 4.8 | 4.3 |
| Cocatalyst feed [g/h] | 5.7 | 5.7 | 5.2 | 3.4 | 4.5 | 4.5 | 5.5 | 4.7 |
| $C_2$ feed [kg/h] | 0.8 | 0.7 | 0.7 | 2.0 | 2.0 | 2.0 | 2.0 | 2.0 |
| $H_2$ feed [g/h] | 5.0 | 5.0 | 5.0 | 10.4 | 10.4 | 9.9 | 10.0 | 10.7 |
| $C_3$ feed [kg/h] | 36.4 | 36.4 | 36.4 | 47.2 | 47.0 | 46.9 | 46.9 | 46.6 |
| Production rate [kg/h] | 0.7 | 0.7 | 0.6 | 1.9 | 1.9 | 1.9 | 1.9 | 1.9 |
| Split [wt %] | 1.2 | 1.1 | 1.0 | 2.8 | 2.3 | 2.6 | 2.8 | 2.5 |
| Loop: | | | | | | | | |
| Temperature [° C.] | 95 | 95 | 95 | 95 | 95 | 95 | 95 | 95 |
| Pressure [bar] | 57 | 57 | 57 | 58 | 56 | 57 | 57 | 57 |
| Cocatalyst feed [g/h] | 5.7 | 5.7 | 5.2 | 2.4 | 4.5 | 4.5 | 5.1 | 4.6 |
| Al/Ti [mol/mol] | 15 | 13 | 13 | | | | | |
| $C_2$ feed [kg/h] | 34 | 34 | 34 | 37 | 37 | 36 | 38 | 38 |
| $H_2$ feed [kg/h] | 134 | 162 | 188 | 37.4 | 54.6 | 96.2 | 181 | 90.6 |
| $C_3$ feed [kg/h] | 96 | 96 | 95 | 96.5 | 91.1 | 90.7 | 90.7 | 88.5 |
| $H_2/C_2$ [mol/kmol] | 466 | 489 | 558 | 235 | 260 | 421 | 765 | 440 |
| $C_2$-concentration [mol %] | 4.9 | 5.7 | 6.0 | 2.3 | 3.5 | 3.6 | 3.9 | 3.3 |
| Split [wt %] | 52 | 52 | 46 | 52 | 43 | 46 | 52 | 47 |
| $MFR_2$ [g/10 min] | 298 | 200 | 283 | 45 | 45 | 207 | 723 | 171 |
| Gas phase: | | | | | | | | |
| Temperature [° C.] | 85 | 85 | 85 | 85 | 85 | 85 | 85 | 85 |
| Pressure [bar] | 20 | 20 | 20 | 20 | 20 | 20 | 20 | 20 |
| $C_2$ feed [kg/h] | 42 | 42 | 50 | 33 | 62 | 52 | 41 | 48 |
| $H_2$ feed [kg/h] | 3.4 | 3.8 | 13 | 10 | 56 | 25 | 12 | 22 |
| $C_4$ feed [kg/h] | 1.5 | 1.6 | 2.3 | 1.2 | 3.0 | 2.0 | 2.9 | 2.6 |
| $H_2/C_2$ ratio [mol/kmol] | 7.8 | 7.7 | 15 | 24 | 54 | 33 | 23 | 25 |
| $C_4/C_2$ [mol/kmol] | 74 | 74 | 81 | 58 | 83 | 70 | 131 | 85 |
| $C_4/C_2$ feed ratio [g/kgPE] | 36 | 39 | 45 | 37 | 48 | 39 | 71 | 54 |
| $C_2$-concentration [mol %] | 11.9 | 12.1 | 15.6 | 6.6 | 21.4 | 16.5 | 8.8 | 11.1 |
| Split [wt %] | 47 | 47 | 53 | 45 | 55 | 51 | 45 | 50 |
| Density [kg/m³] | 950.3 | 950.1 | 947.7 | 949.1 | 945.6 | 947.0 | 946.5 | 948.2 |
| $C_4$ content [mol %] | 0.37 | 0.39 | 0.45 | 0.47 | 0.61 | 0.55 | 0.88 | 0.60 |
| Compounding: | | | | | | | | |
| Feed [kg/h] | 221 | 221 | 221 | 283 | 263 | 255 | 230 | 231 |
| Screw Speed [rpm] | 349 | 349 | 349 | 401 | 385 | 400 | 453 | 450 |
| SEI [kWh/t] | 201 | 204 | 212 | 230 | 229 | 228 | 228 | 237 |
| Melt temperature [° C.] | 237 | 247 | 241 | 267 | 260 | 258 | 257 | 263 |
| Zone 1 temperature [° C.] | 100 | 100 | 100 | 100 | 100 | 100 | 100 | 100 |
| Zone 2 temperature [° C.] | 200 | 200 | 200 | 200 | 200 | 200 | 200 | 200 |
| Zone 3 temperature [° C.] | 250 | 250 | 250 | 250 | 250 | 250 | 250 | 250 |
| Zone 4 temperature [° C.] | 180 | 180 | 180 | 180 | 180 | 180 | 180 | 180 |
| Carbon black [wt %] | 3.0 | 1.9 | 2.5 | 2.4 | 2.4 | 2.2 | 2.5 | 2.4 |
| Density [kg/m³] | 965.0 | 958.9 | 960.9 | 960.6 | 957.5 | 959.8 | 958.9 | 957.6 |
| $MFR_5$ [g/10 min] | 0.23 | 0.21 | 0.24 | 0.46 | 0.67 | 0.32 | 0.65 | 0.37 |
| $MFR_{21}$ [g/10 min] | 6.8 | 5.8 | 5.5 | 13.0 | 12.0 | 8.1 | 21.0 | 11.0 |
| $FRR_{21/5}$ | 29.6 | 27.6 | 22.9 | 28.2 | 17.9 | 25.3 | 32.3 | 29.7 |
| Mw [$10^3$ g/mol] | 219 | 223 | 209 | 200 | 163 | 203 | 180 | 195 |
| Mn [$10^3$ g/mol] | 10.0 | 11.0 | 12.0 | 10.5 | 12.4 | 9.7 | 6.8 | 8.6 |
| Mz [$10^3$ g/mol] | 1127 | 1159 | 982 | 1185 | 713 | 1075 | 1090 | 1090 |
| Mw/Mn | 21.6 | 20.7 | 18.1 | 19.1 | 13.2 | 20.8 | 26.6 | 22.6 |
| PI [$Pa^{-1}$] | 2.3 | 2.4 | 1.8 | 3.6 | 1.6 | 2.4 | 3.3 | 3.0 |
| complex viscosity eta at 0.05 rad/s [kPa s] | 1.508E+05 | 1.647E+05 | 1.354E+05 | 1.055E+05 | 0.586E+05 | 1.126E+05 | 0.790E+05 | 1.089E+05 |
| complex viscosity eta at 300 rad/s [kPa s] | 1294 | 1329 | 1469 | 1005 | 1178 | 1180 | 851 | 1027 |
| $Eta_{747}$ [Pas] | 3.99E+05 | 4.88E+05 | 3.20E+05 | 4.10E+05 | 1.16E+05 | 3.49E+05 | 2.12E+05 | 3.39E+05 |

TABLE 1-continued

Polymerization conditions

| | IE1 | IE2 | IE3 | CE1 | CE2 | CE3 | CE4 | CE5 |
|---|---|---|---|---|---|---|---|---|
| G' (5 kPa) [Pa] | 2403 | 2496 | 2182 | 3079 | 2173 | 2663 | 2763 | 2792 |
| G'(2 kPa) [Pa] | 811 | 843 | 729 | 1056 | 706 | 917 | 904 | 947 |
| $SHI_{2.7/210}$ | 35.3 | 37.5 | 22.8 | 66.6 | 19.7 | 39.0 | 66.3 | 56.1 |
| $SHI_{1/100}$ | 14.4 | 15.6 | 10.5 | 28.6 | 9.7 | 17.1 | 22.5 | 21.7 |
| Tensile modulus, 23° C. [MPa] | 1123 | 1035 | 1107 | 1102 | 1025 | 1063 | 1045 | 1089 |
| Tensile stress at yield, −45° C. [MPa] | 49.4 | 49.3 | 47.3 | 48.5 | 46.0 | 47.4 | 48.5 | 48.8 |
| Tensile strain at yield, −45° C. [%] | 6.0 | 6.0 | 6.3 | 6.1 | 6.5 | 6.1 | 5.6 | 5.8 |
| Tensile strength, −45° C. [MPa] | 49.4 | 49.3 | 47.3 | 48.5 | 46.0 | 47.4 | 48.5 | 48.8 |
| Tensile strain at tensile strength, −45° C. [%] | 6.0 | 6.0 | 6.3 | 6.1 | 6.5 | 6.1 | 5.6 | 5.8 |
| Tensile stress at break, −45° C. [MPa] | 20.0 | 24.5 | 27.6 | 17.1 | 19.4 | 18.9 | 22.5 | 18.2 |
| Elongation at break, −45° C. [%] | 81 | 109 | 149 | 33 | 79 | 85 | 147 | 64 |
| Elongation at break (−45° C.)/Comonomer content [%/mol %] | 218 | 279 | 331 | 68 | 130 | 155 | 167 | 107 |
| Charpy NIS, 0° C. [kg/m³] | 20.4 | 22.0 | 23.7 | 14.2 | 16.8 | 17.2 | 12.2 | 14.5 |

The invention claimed is:

1. A polyethylene composition comprising
a base resin being a copolymer of ethylene with at least one alpha olefin comonomer having from 3 to 12 carbon atoms, the base resin having a density of more than 940.0 kg/m³ and equal to or less than 952.5 kg/m³, determined according to ISO 1183-1:2004,
wherein the composition has a melt flow rate $MFR_5$ (190° C., 5 kg) of 0.10 to 3.0 g/10 min, determined according to ISO 1133, a storage modulus of G' (2 kPa) of 600 Pa to 900 Pa, a shear thinning index $SHI_{2.7/210}$ of 20 to 50 and
the composition has an elongation at break (EB) at −45° C. in dependence of the molar comonomer content (mol. CC) of the base resin following the following equation EB[%]≥175[%/mol %]·mol. CC[mol %], whereby the elongation at break (EB) is determined according to ISO 527-1 at a temperature of −45° C. and the molar comonomer content (mol. CC) reflects the molar content of alpha-olefin comonomer units in the total content of monomer units of the base resin.

2. The polyethylene composition according to claim 1 having a polydispersity index PI within the range of equal to or higher than 1.5 Pa⁻¹ and equal to or less than 3.0 Pa⁻¹.

3. The polyethylene composition according to claim 1, wherein the base resin has a content of units derived from at least one alpha olefin comonomer having from 3 to 12 carbon atoms of 0.1 to 3.0 mol.-%.

4. The polyethylene composition according to claim 1, wherein the composition has a tensile modulus (23° C.) of at least 900 MPa.

5. The polyethylene composition according to claim 1, wherein the composition has a Charpy Notched Impact Strength at 0° C. of at least 10 kJ/m³.

6. The polyethylene composition according to claim 1, wherein the composition has a flow rate ratio $FRR_{21/5}$, being the ratio of $MFR_{21}$ to $MFR_5$, of 15 to 40.

7. The polyethylene composition according to claim 1, wherein the composition has a complex viscosity at 0.05 rad/s eta*$_{0.05\ rad/s}$ of 100 000 Pa·s to 220 000 Pa·s.

8. The polyethylene composition according to claim 1, wherein the composition has a molecular weight distribution, being the ratio of Mw/Mn, of 10 to 30.

9. The polyethylene composition according to claim 1, wherein the base resin comprises at least two ethylene homo- or copolymer fractions (A) and (B) being different in their weight average molecular weight $M_w$,
wherein fraction (A) is an ethylene homopolymer and fraction (B) is a copolymers of ethylene and at least one alpha-olefin comonomer units with 3 to 12 carbon atoms,
whereby fraction (A) has a melt flow rate $MFR_2$ (190°, 2.16 kg) of 100 to 400 g/10 min, and
wherein fraction (A) is present in an amount of 44 to 54 wt.-% with respect to the base resin.

10. A polyethylene composition obtainable by a multistage process, the multistage process comprising
a) polymerizing ethylene in the presence of
a silica supported Ziegler Natta catalyst having a molar composition of the catalyst including
Al 1.30 to 1.65 mol/kg silica,
Mg 1.25 to 1.61 mol/kg silica,
Ti 0.70 to 0.90 mol/kg silica
and having a mean particle size (D50) of 7 to 15 μm, preferably of 8 to 12 μm
in a first reactor
for obtaining an intermediate material, the intermediate material having a has a melt flow rate $MFR_2$ (190°, 2.16 kg) of 100 to 400 g/10 min; and
b) transferring the reaction product to gas phase reactor
(i) feeding ethylene and comonomer to the gas phase reactor
(ii) further polymerizing the intermediate
to obtain a base resin having a density of more than 940.0 kg/m³ and equal to or less than 952.5 kg/m³, determined according to ISO 1183-1:2004, c) extruding the base resin into a polyethylene composition having a melt flow rate MFR$_5$ (190° C., 5 kg) of 0.10 to 3.0 g/10 min, determined according to ISO 1133, a storage modulus of G' (2 kPa) of 600 Pa to 900 Pa, a shear thinning index SHI$_{2.7/210}$ of 20 to 50, and the composition has an elongation at break (EB) at −45° C. in dependence of the molar comonomer content (mol. CC) of the base resin following the following equation $$EB[\%] \geq 175[\%/mol\ \%] \cdot mol.\ CC[mol\ \%],$$

whereby the elongation at break (EB) is determined according to ISO 527-1 at a temperature of −45° C. and the molar comonomer content (mol. CC) reflects the molar content of alpha-olefin comonomer units in the total content of monomer units of the base resin.

11. An article comprising the polyethylene composition according to claim 1.

12. The article according to claim 11 being a pipe or pipe fitting.

13. The article according to claim 11 being a pipe, the outer surface of which is coated with a coating layer comprising a polyethylene composition which comprises
   a base resin being a copolymer of ethylene with at least one alpha olefin comonomer having from 3 to 12 carbon atoms, the base resin having a density of more than 940.0 kg/m³ and equal to or less than 952.5 kg/m³, determined according to ISO 1183-1:2004,
   wherein the composition has a melt flow rate MFR$_5$ (190° C., 5 kg) of 0.10 to 3.0 g/10 min, determined according to ISO 1133, a storage modulus of G' (2 kPa) of 600 Pa to 900 Pa, a shear thinning index SHI$_{2.7/210}$ of 20 to 50 and
   the composition has an elongation at break (EB) at −45° C. in dependence of the molar comonomer content (mol. CC) of the base resin following the following equation $$EB[\%] \geq 175[\%/mol\ \%] \cdot mol.\ CC[mol\ \%],$$

whereby the elongation at break (EB) is determined according to ISO 527-1 at a temperature of −45° C. and the molar comonomer content (mol. CC) reflects the molar content of alpha-olefin comonomer units in the total content of monomer units of the base resin.

14. An article comprising the polyethylene composition according to claim 10.

15. The article according to claim 14 being a pipe or pipe fitting.

16. The article according to claim 11 being a pipe, the outer surface of which is coated with a coating layer comprising a polyethylene composition obtainable by
   a multistage process, the multistage process comprising
   d) polymerizing ethylene in the presence of
      a silica supported Ziegler Natta catalyst having a molar composition of the catalyst including
         Al 1.30 to 1.65 mol/kg silica,
         Mg 1.25 to 1.61 mol/kg silica,
         Ti 0.70 to 0.90 mol/kg silica
      and having a mean particle size (D50) of 7 to 15 μm, preferably of 8 to 12 μm
      in a first reactor
      for obtaining an intermediate material, the intermediate material having a has a melt flow rate MFR$_2$ (190°, 2.16 kg) of 100 to 400 g/10 min; and
   e) transferring the reaction product to gas phase reactor
      (iii) feeding ethylene and comonomer to the gas phase reactor
      (iv) further polymerizing the intermediate
   to obtain a base resin having a density of more than 940.0 kg/m³ and equal to or less than 952.5 kg/m³, determined according to ISO 1183-1:2004,
   f) extruding the base resin into a polyethylene composition having a melt flow rate MFR$_5$ (190° C., 5 kg) of 0.10 to 3.0 g/10 min, determined according to ISO 1133, a storage modulus of G' (2 kPa) of 600 Pa to 900 Pa, a shear thinning index SHI$_{2.7/210}$ of 20 to 50, and the composition has an elongation at break (EB) at −45° C. in dependence of the molar comonomer content (mol. CC) of the base resin following the following equation $$EB[\%] \geq 175[\%/mol\ \%] \cdot mol.\ CC[mol\ \%],$$

whereby the elongation at break (EB) is determined according to ISO 527-1 at a temperature of −45° C. and the molar comonomer content (mol. CC) reflects the molar content of alpha-olefin comonomer units in the total content of monomer units of the base resin.

* * * * *